United States Patent [19]

McCormick et al.

[11] Patent Number: 4,785,315

[45] Date of Patent: Nov. 15, 1988

[54] INK SUPPLY SYSTEM FOR AN INK JET APPARATUS

[75] Inventors: John A. McCormick, Brookfield; Lisa M. Schmidle, Southbury, both of Conn.

[73] Assignee: Dataproducts Corporation, Woodland Hills, Calif.

[21] Appl. No.: 11,589

[22] Filed: Feb. 6, 1987

Related U.S. Application Data

[63] Continuation-in-part of Ser. No. 661,794, Oct. 16, 1984, abandoned.

[51] Int. Cl.⁴ ............................................ G01D 15/16

[52] U.S. Cl. ................................ 346/140 R; 346/1.1

[58] Field of Search ................................ 346/140, 1.1

[56] References Cited

U.S. PATENT DOCUMENTS

| | | | |
|---|---|---|---|
| 3,974,508 | 8/1976 | Blumenthal | 346/140 |
| 4,380,770 | 4/1983 | Maruyama | 346/140 |
| 4,527,175 | 7/1985 | Kojima | 346/140 |

*Primary Examiner*—Joseph W. Hartary

*Attorney, Agent, or Firm*—Woodcock Washburn Kurtz

[57] ABSTRACT

A method and apparatus for supplying ink to an array of ink jets is provided by two fluidically independent reservoirs, each reservoir supplying ink to a respective end of a manifold which communicates with the array of ink jets via their inlet restrictors. During normal operations involving an acceleration of the array along a scanning path, the ink levels in the two reservoirs will remain the same since any difference in their levels will create a pressure differential that drives a flow of ink through the manifold from the higher level reservoir until such time that their levels equalize.

20 Claims, 3 Drawing Sheets

INK SUPPLY SYSTEM FOR AN INK JET APPARATUS

CROSS REFERENCE TO RELATED APPLICATIONS

This application is a continuation-in-part of U.S. patent Application Ser. No. 661,794, filed Oct. 16, 1984, now abandoned.

BACKGROUND OF THE INVENTION

This invention relates generally to ink jet apparatus, and more particularly to ink supplies for an ink jet apparatus.

Ink jet printers, particularly those of the impulse or the drop-on-demand types, have special ink supply requirements since the usual method replacing ink expelled from the jets is by capillary action. Prior art printers include ink supply systems which typically comprise a single reservoir containing ink, a manifold for supplying ink to an array of jets, and some form of flow path from the manifold to the reservoir. In apparatus having a large number of jets within the array, for example a 32-channel array, there is a problem of minimizing cross talk in the form of pressure disturbances and waves through the manifold.

A cross talk type of disturbance is generally characterized by the development of a pressure impulse in the manifold due to the small volume liquid injection derived from the pulsing of a jet. In order to reduce such cross talk, one standard arrangement has been to design a manifold to present inlet restrictor paths with as large a fluidic compliance as possible, the magnitude of the pressure wave being inversely proportional to such compliance. The value of compliance is a function of both the compressability of the liquid volume and flexibility of the wall surrounding the liquid. Such manifold compliance is also important to minimize the effects of external shock and vibration which, in certain situations, can lead to depriming of the apparatus. As a result, many arrangements have been proposed wherein a large compliance is achieved by forming a major portion of the manifold wall with a thin compliant diaphragm.

The construction of a manifold so as to maximize its compliance generally requires an expansion of the size of the manifold in order to achieve the necessary flexural compliance of the diaphragm. This results in an ink jet head which is larger than optimum, requiring the ink reservoir to be situated at a substantial distance. Such a requirement has lead to a variety of designs which generally contain a tortuous flow path from the reservoir to the manifold. In those cases, even though the reservoir itself represents a nearly infinite fluidic compliance, the impedence of the connecting path does not allow the manifold to take advantage of such compliance. Thus, the manifold design itself must essentially take on the entire job of minimizing the cross talk and the effects of external shock or disturbance, and generally fails to take advantage of the beneficial compliance characteristics of the reservoir. Arrangements for optimizing the compliance characteristics of the manifold have, therefore, resulted in a tradeoff of a larger manifold configuration for a larger print head and relative displacement of the reservoir away from the array of ink jets. Accordingly, the problem of cross talk is solved at the expense of requiring a larger and bulkier print head which is clearly disadvantageous.

Another problem which results from a large sized manifold is that of air bubble generation at the time of filling the apparatus with ink. The feeding of ink from a relatively small inlet to a relatively large manifold may result in excessive air bubble generation. Of course, if the manifold is large, then a further space penalty must be paid if the inlet tube is made large so as to reduce the air bubble problem.

One suitable prior art approach is disclosed in copending U.S. patent Application Ser. No. 661,794, filed Oct. 16, 1984, assigned to the assignee of the present invention, and incorporated herein by reference. In that approach, the ink jet apparatus provides a reservoir having at least a portion located in very close proximity to the ink jet chamber portion which contains an array of ink jet chambers, and a manifold system for feeding ink from the reservoir to the chambers including a narrow manifold with a very short feed tube connecting the manifold to the reservoir, the feed tube and the manifold having substantially matching cross-sectional forms. The narrow manifold is suitably constructed as a groove in a transducer support structure, such that the manifold does not contain any high compliance element. As a result, the short length of the inlet feed tube and the matching of such a short tube with the manifold ensures that the high compliance characteristic of the reservoir is effectively presented to the chamber inlets, thereby reducing cross talk and reducing the trapping of air when the apparatus is filled with ink.

While the apparatus disclosed in the aforedescribed copending U.S. patent Application Ser. No. 661,794, now abandoned is generally suitable for use with inks such as hot melt or phase change inks, the use of hot melt or phase change inks nevertheless creates additional design requirements with respect to the reservoir system. As is well known, a hot melt or phase change ink of the type utilized in an ink jet is characteristically solid at room temperature. When heated, the ink will melt to a consistency so as to be jettable. For a discussion of the characteristics of such ink and the use thereof in ink jet apparatus, references to U.S. Pat. No. 4,390,369 and pending U.S. Application Ser. No. 644,542, filed Aug. 27, 1984; Ser. No. 909,007, filed Sept. 16, 1986; and Ser. No. 938,334, filed Dec. 3, 1986 all assigned to the same assignee as this invention and incorporated herein by reference.

SUMMARY OF THE INVENTION

Accordingly, it is a general object of the present invention to provide an ink jet apparatus having a reservoir configuration which facilitates priming.

It is a more specific object of this invention to provide an ink jet apparatus having a reservoir configuration which minimizes the possibility of forming air bubbles, especially when using hot melt or phase change ink.

It is another object of this invention to provide an ink jet apparatus wherein cross talk through reservoir configurations which supply a plurality of ink jets is minimized.

It is yet another object of this invention to provide an ink jet apparatus which has the ability for purging the manifold without the need to drain off ink externally.

It is still another object of the present invention to provide an ink apparatus in which the development of a static fluid column pressure in the manifold under acceleration of the print head is minimized.

In accordance with these and other objects, the ink jet apparatus of the present invention provides a reservoir configuration having two fluidically independent reservoirs, each reservoir supplying ink to a respective end of a manifold which communicates with an array of ink jets via their inlet restrictors. During normal operation, the ink levels in the two reservoirs will remain the same since any difference in their levels will create a pressure differential that drives a flow of ink through the manifold from the higher level reservoir until such time that their levels equalize. The manifold can be easily purged without removing ink from the system by applying a slight pneumatic pressure to a vent port of one of the reservoirs while leaving opened the vent port for the other reservoir, thereby accomplishing the purge by the transfer of ink through the manifold between the two reservoirs. Any air that is purged from the manifold escapes through the open reservoir vent.

In accordance with yet another important aspect of the invention, a pressure prime, in which the individual chambers associated with the array of ink jets are purged through their orifices, is accomplished by simultaneously applying pneumatic pressure to the two reservoir vents. An ink jet apparatus which incorporates the reservoir arrangement is conveniently filled and initially primed by filling a first one of the reservoirs to a level slightly above the manifold. Since the remaining reservoir is initially empty, a flow will establish itself through the manifold into that reservoir and will continue until such time that the ink levels in the two reservoirs are the same. The continued flow through the manifold as the reservoir ink levels equalize aids in the removal of any trapped air bubbles from the manifold, and obviates the necessity of draining off the ink externally thereby eliminating the external manifold vent and increasing the compactness of the resulting ink jet apparatus.

In accordance with still another important aspect of the invention, the hydrostatic pressure often developing in prior art horizontal manifolds having a closed end under acceleration along the manifold length is substantially diminished by having each end of the manifold open and communicating with a separate reservoir. The present invention inhibits the buildup of hydrostatic pressure by utilizing the print head acceleration to set up a flow of liquid through the manifold between the two reservoirs.

Other objects, advantages and novel features of this invention will become apparent from the following detailed description of a preferred embodiment when considered in conjunction with the accompanying drawings wherein:

DESCRIPTION OF THE PREFERRED EMBODIMENT

Figure 1:
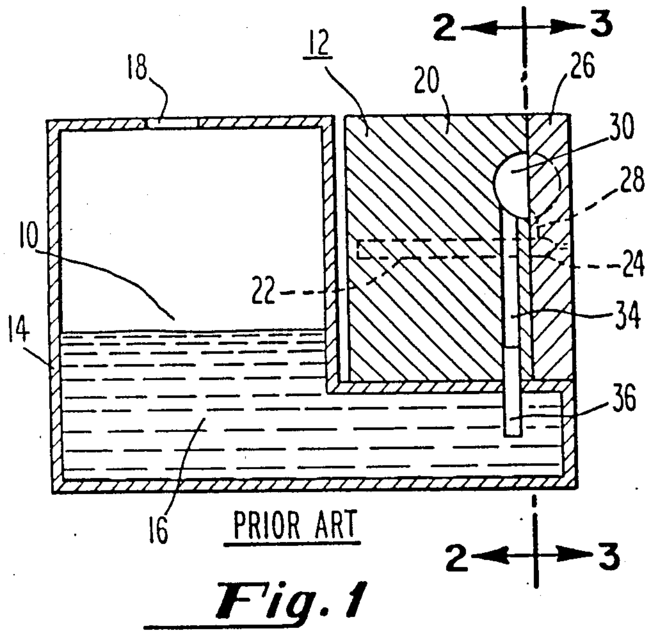
PRIOR ART Fig. 1
FIG. 1 is a diagrammatic side view of an integrated reservoir and print head of a prior art ink jet apparatus utilizing a single reservoir.

Referring now to the drawings, wherein like characters designate like or corresponding parts throughout the several views, there is shown in FIGS. 1-4 a prior art configuration of an ink jet apparatus comprising an integrally combined reservoir 10 and a print head, or ink jet head 12. The reservoir is defined by a housing 14 which contains ink 16 therein, and has a vent or port 18 supplying atmosphere to the reservoir 40. Port 43, or other means not shown, may be utilized to introduce ink into the system either in the form of pellets of hot melt ink or other types of ordinary fluidic ink. One suitable such method of introducing pellets of hot melt ink into the apparatus as shown is disclosed in copending U.S. patent Application Ser. No. 829,572, filed Feb. 14, 1986, now U.S. Pat. No. 4,739,339, assigned to the assignee of the present invention, and incorporated herein by reference.

Figure 4:
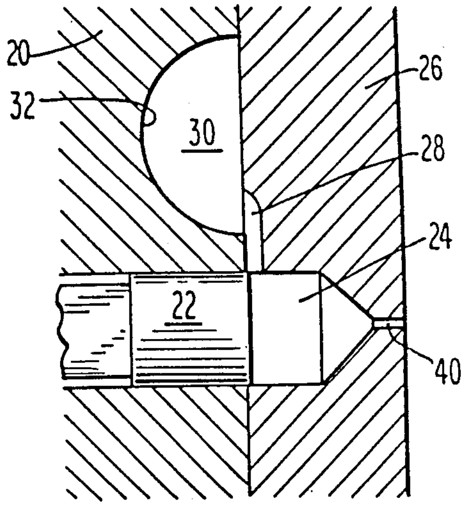
PRIOR ART Fig. 4
FIG. 4 is a detailed view of a portion of the prior art print head illustrating the relationship of the manifold, ink jet chamber and transducer.
Figure 2:
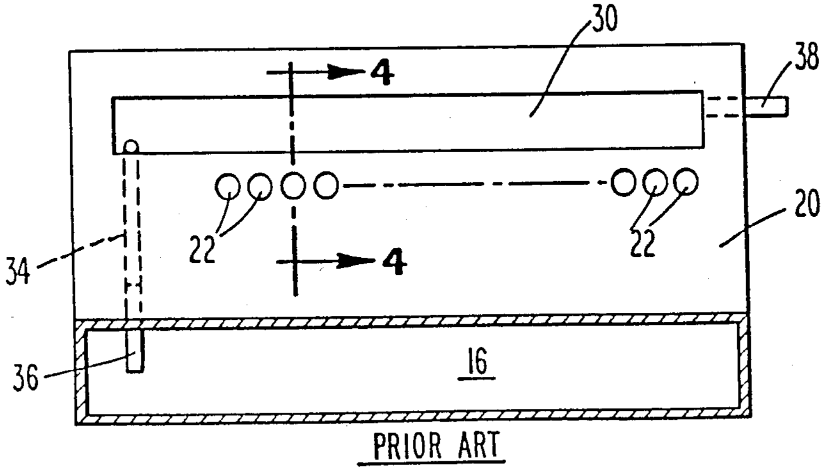
PRIOR ART Fig. 2
FIG. 2 is a sectional view taken along lines 2—2 of FIG. 1.

The print head 12 comprises a transducer support portion 20, which supports an array of transducers 22 (FIG. 4). As illustrated in FIG. 2, the transducers 22 are aligned longitudinally with the corresponding ink chambers 24, the activation of the transducers 22 producing ink droplets in an known manner. To the front of the transducer support portion 20, there is illustrated a chamber plate 26 which contains the chambers 24 and restrictor inlets 28, as further illustrated in FIGS. 3 and 4. Each chamber communicates with a manifold 30 through its respective inlet 28 in a known fashion. In many ink jet arrangements, the ink jet head is constructed of laminar or plate construction, and while the inlet restrictors 28 are illustrated herein as being grooved into the chamber plate, it is to be understood that there may be a separate inlet restrictor plate interposed between the transducer support portion 20 and the chamber plate 26.

As shown more clearly in FIG. 4, the manifold 30 consists of a hemispherical groove 32 in front of the transducer support portion 20. Transducer support portion 20 may suitably be made of aluminum, such that the grooved wall of the manifold is aluminum which as such does not present any compliance. Manifold 30 communicates with reservoir 10 through a manifold inlet 34, which is suitably a bore drilled vertically through the transducer support portion 20. An inlet tube as illustrated at 36 may be press fit up into the manifold inlet 34, and extends down into the reservoir 10. Alternatively, the print head 12 may have a solid portion which extends further down into the reservoir, carrying the inlet port 34.

The manifold 30 extends from the inlet 34 and travels adjacent to and along the arrays of transducers 22 and chambers 24, and contains a vent 38 at its far end. The vent 38 is normally capped or plugged to enable surface tension forces at the menisci formed at orifices 40 to support a negative head relative to the vented reservoir 10, but is unplugged for priming operations.

One problem with such a reservoir arrangement, however, is that there are inherent difficulties in transferring hot melt or phase change ink from the open manifold vent 38 to an external receptacle when it becomes necessary to purge the manifold 30 in order to perform an effective reprime of the device in the field. That is, because of the potential for air entrapment in the manifold 30 over repeated freeze-melt cycles of hot melt ink contained in such a device, it becomes necessary to purge the device by applying a slight pneumatic pressure to the reservoir vent 18 with the manifold vent 38 open.

Figure 5:
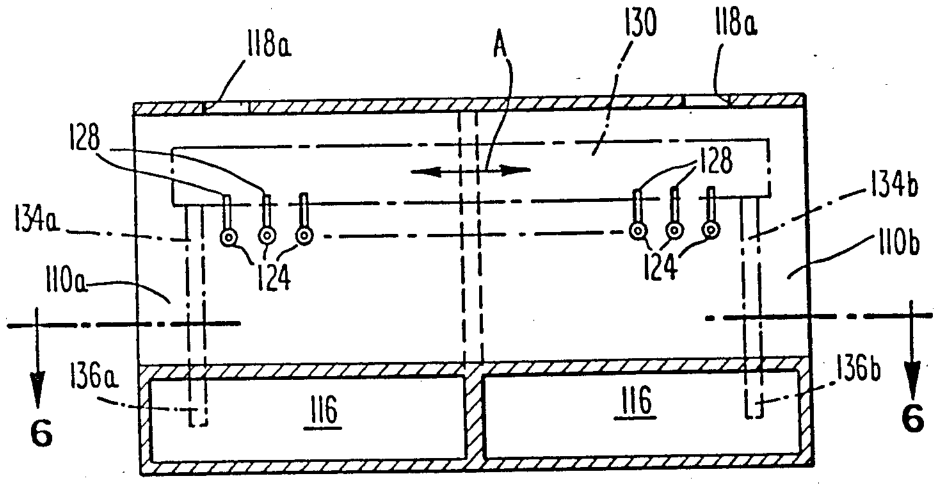
FIG. 5 is a diagrammatic view of a first embodiment of a integrated dual reservoir arrangement and print head according to the present invention.
Figure 6:
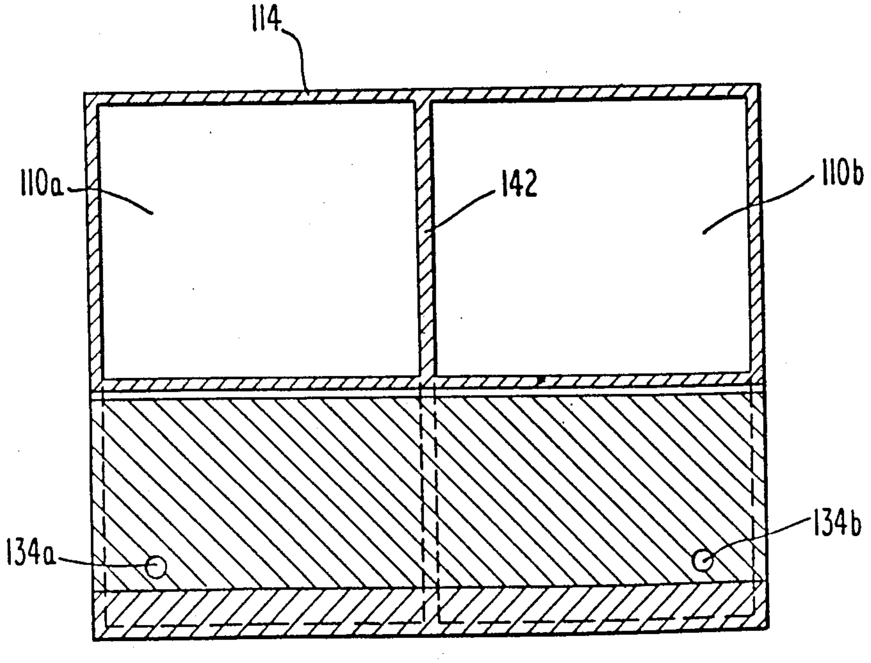
FIG. 6 is a plan view taken along lines 6—6 of FIG. 5.

Referring now to FIGS. 5 and 6, there is shown therein a first embodiment of an ink jet apparatus 100 which incorporates a dual reservoir configuration in accordance with the present invention. The apparatus 100, like the apparatus shown in FIGS. 1–4, includes a print head 110 having a manifold 130 in communication with an array of ink jet chambers 124 via respective inlet restrictors 128. A pair of fluidically independent reservoirs **110*a* and 110*b* separated from each other by a wall 142 formed within the housing 114, are vented to the atmosphere via ports 118*a* and 118*b*, and provide ink to the manifold 130 through respective inlet pipes 134*a* and 134*b*. The apparatus 100 may be conveniently filled and initially primed, for example, by filling reservoir 110*a* with ink to a level slightly above the level of the manifold 130. A flow (indicated by the arrow A) will establish itself through the manifold 130 into the second reservoir 110*b*, and will continue until such time that the ink levels in the two reservoirs 110*a* and 110*b* are the same. Such continued flow through the manifold 130 as the reservoirs 110*a* and 110*b* equalize aids in the removal of any trapped air bubbles from the manifold 130**.

In accordance with one important aspect of the invention, such a method of filling and priming the apparatus 100 eliminates the necessity of an external manifold vent 38 (FIG. 2) which is used to drain off ink externally during prime and purge. That is, in order to purge the apparatus 100 without removing ink from the system, a slight pneumatic pressure is applied to the vent port of one of the reservoirs **110*a* or 110*b*, for example port 118*a*, while leaving open the vent port 118*b* for the other reservoir. The resulting transfer of ink through the manifold 130 between the two reservoirs 110*a* and 110*b* accomplishes the purge. Any air that is purged from the manifold 130 escapes through the open reservoir vent 118*b*. Furthermore, a pressure prime may suitably be accomplished in accordance with the present invention by simultaneously applying a slight pneumatic pressure to both reservoir vents 118*a* and 118*b***.

Figure 7:
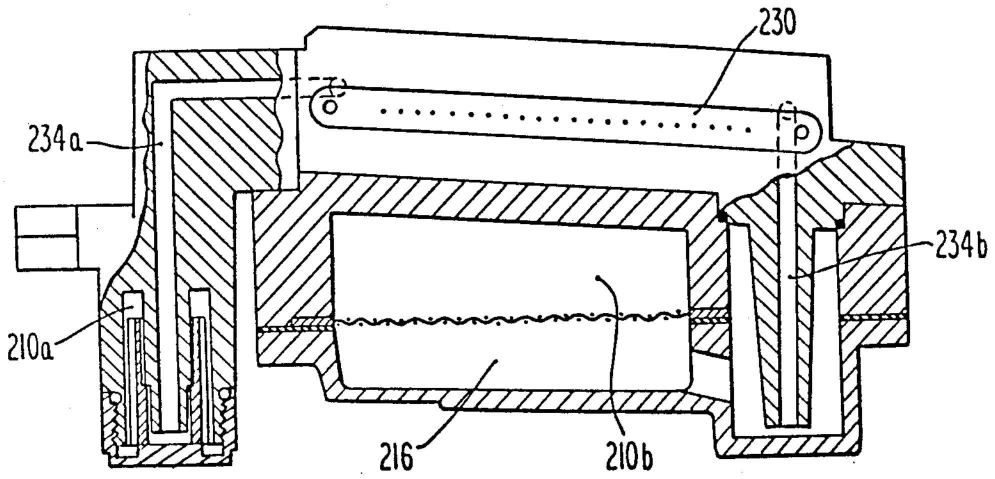
FIG. 7 is a sectional view of another embodiment of the dual reservoir ink jet apparatus according to the present invention.
Figure 8:
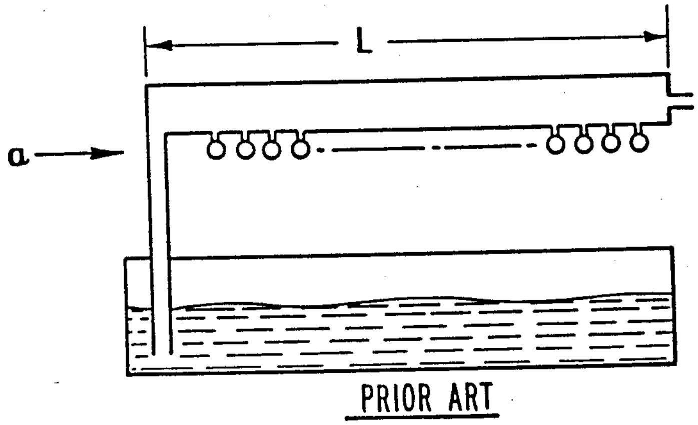
FIG. 8 illustrates schematically the effects of print head acceleration on prior art single reservoir ink jet devices.
Figure 9:
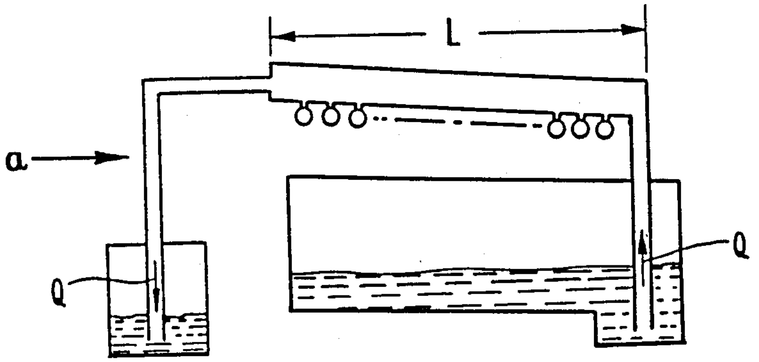
FIG. 9 illustrates schematically the effects of print head acceleration on apparatus according to the present invention.

With reference now to FIGS. 7–9, a presently preferred embodiment of the invetion and its advantages over prior art single reservoir configurations will be discussed. As shown in FIG. 7, an ink jet apparatus 200 according to the present invention is comprised generally of a pair of fluidically independent reservoirs **210*a* and 210*b* containing a supply of ink 216. While the supply of ink 216 contained within the reservoir 210*b* appears to be substantially larger than that which is contained with the reservoir 210*a*, it should be understood that the relative amounts of ink 216 within the reservoirs of any ink jet apparatus which incorporates a dual reservoir configuration as described herein is not critical for the practice of the present invention as long as there is a sufficient amount in each to compensate for print head acceleration. For example, both reservoirs could be of substantially the same volume in a configuration similar to that shown in FIGS. 5 and 6**. It should be noted at this juncture, however, that each reservoir of a dual reservoir ink jet apparatus in accordance with the present invention must be subject to substantially the same acceleration effects of a scanning print head.

Like the embodiment shown in FIGS. 5 and 6, the ink jet apparatus 200 further includes inlet pipes **234*a* and 234*b* which feed ink respectively from the reservoirs 210*a* and 210*b* to a manifold 230 in communication with a slanted array of ink jet orifices 240. Each of the reservoirs 210*a* and 210*b*** are also vented separately through means not shown.

Figure 3:
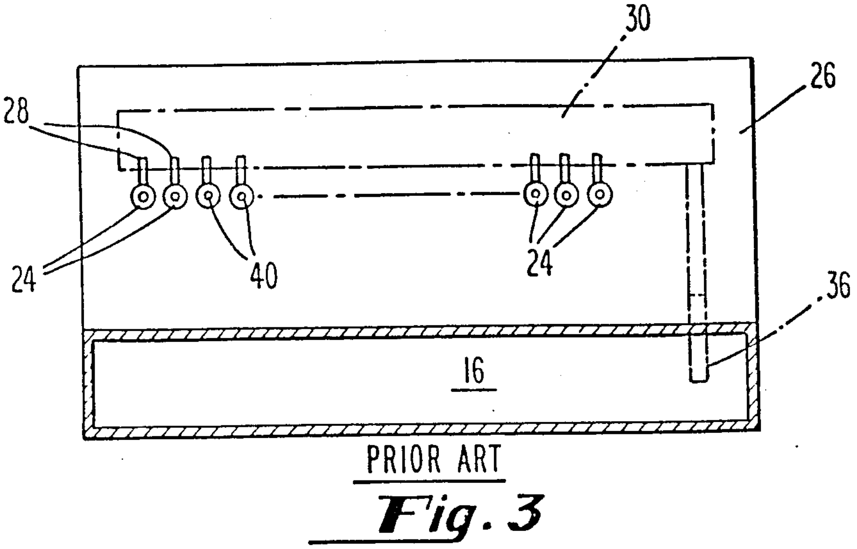
PRIOR ART Fig. 3
FIG. 3 is a sectional view taken along lines 3—3 of FIG. 1.

There is a further problem associated with the prior art ink delivery system of FIGS. 1–4 that concerns the capping off of the manifold vent 38 during normal operations of the print head 12. In a typical printer environment, the print head traverses or scans horizontally with respect to the orientation of FIGS. 2 and 3 as a line of text is being printed. At the end of any line of text, the direction of traverse is reversed and the next line printed in the opposite direction. During the change of direction that occurs at the end of each line, the print head is experiencing an acceleration a, the sign of which depends on whether the change is from left-to-right or from right-to-left. Because the manifold 30 as shown in FIGS. 2 and 3 is aligned approximately in the direction of such horizontal acceleration, an acceleration pressure head $\rho aL$ ($\rho$=liquid density, L=length of manifold in acceleration direction) is imposed on the ink contained in the manifold 30. With the vent 38 capped, this acceleration head will result in a linearly varying gauge pressure in the manifold 30 from $p=o$ at the inlet 36 (FIGS. 2 and 3) to $p=\rho aL$ at the capped vent 38.

This acceleration-induced manifold pressure is transmitted directly to the liquid-air meniscus at the droplet ejection orifice 40. Hence, a necessary condition for avoidance of meniscus rupture and consequent ink jet failure is that the peak acceleration pressures, $\pm\rho aL$, be substantially lower than the capillary pressure $p_c$ of a hemispherical meniscus. This capillary pressure $p_c$ is given by the equation:

$$P_c = \frac{2\gamma}{r},$$

where $\gamma$ is the liquid surface tension and r is the orifice exit radius. A positive value of $p_c$ pertains to a bulging meniscus as occurs under $+\rho aL$ while the negative value pertains to a retracted meniscus occurring under $-\rho aL$, the opposite direction of acceleration. With respect to the orientation of FIG. 2, the pressure at the capped vent 38 will be $+\rho aL$ when a is directed from right to left and $-\rho aL$ when a is directed from left to right. By requiring that the magnitude of $\rho aL$ be substantially less than the magnitude of $p_c$, prior art devices effectively limited the magnitude of the acceleration a that may be imposed by the scanning print head in order to reverse the direction of traverse at the end of a line of text. It would therefore be desirable to have higher print head accelerations since the higher the allowable magnitude of a, the less time is consumed by the act of changing the direction of traverse, and hence the higher can be the overall rate of printing.

In a typical case where $\rho=0.85$ grams/cc, $\gamma=29$ dynes/cm, $L=5.0$ cm and $r=30.5$ $\mu$m, evidence of meniscus rupture has been observed once a exceeds twice the acceleration of gravity ($g=9.81$ m/sec$^2$). Under this condition, $\rho aL=834$ Pa and $p_c=1902$ Pa, indicating a factor of two difference to be barely sufficient as a margin of safety. Since to maximize the overall rate of printing it is known to be desirable for a to greatly exceed 2 g, a manifold design that inhibits the pressures developed by the acceleration head $\rho aL$ becomes an important goal.

Referring now to FIGS. 8 and 9 in conjunction with FIGS. 5-7, a further aspect of the present invention and its advantages over the prior art will be discussed. When a dual reservoir ink jet apparatus according to the present invention (FIG. 9) is accelerated horizontally, say from left to right, the acceleration head $\rho aL$ ($\rho$—liquid density, a=acceleration, L=length of manifold) will drive a flow rate Q through the manifold and the inlets from the right reservoir to the left reservoir. Assuming quasi-steady conditions, Q will be given by the equation:

$$Q = \frac{\rho aL}{R_T},$$

where $R_T$ is the total viscous flow resistance of the line comprised of the manifold and the left and right inlets. In the ideal case, wherein the inlets contribute zero flow resistance, there will be prssure boundary conditions p=o at each end of the manifold due to direct communication with the reservoirs at ambient pressure. With p=o at each end of the manifold and with the acceleration head paL balancing the viscous head $R_TQ$, the condition p=o will exist along the entire manifold length. In practice, however, the flow resistance for the inlets will not be negligible. The p=o boundary conditions will hold where the inlets meet the left and right reservoirs rather than holding at the left and right ends of the manifold. With $R_L$ and $R_R$ representing the flow resistances of the left and right inlets, and with no acceleration head being present in such inlets due to their orientation at right angles to the acceleration direction, the left inlet will contain a pressure drop $R_LQ$ and the right inlet a pressure drop $R_RQ$. With the flow Q proceeding from right to left (print head acceleration left to right) in FIG. 8, the manifold pressure boundary conditions will be $p=R_LQ$ at the left end of the manifold and $p=-R_RQ$ at the right end. Hence, the total manifold pressure drop $\Delta p_m$ from left to right is given by the equation:

$$\Delta p_m=(R_L+R_R)Q,$$

which, with Q as given above, becomes:

$$\Delta p_m = \frac{(R_L + R_R)}{R_T} \rho aL,$$

where $R_T=R_R+R_L+R_m$ and $R_m$ is the manifold flow resistance. In the prior art device of FIG. 8 as previously described, where one end of manifold is closed, there is no flow under acceleration so that the manifold pressure drop develops to balance the acceleration head:

$$\Delta p_m=\rho aL.$$

It is therefore essential in the practice of the present invention to size the inlet and manifold lengths and cross-sectional areas such that the ratio $(R_L+R_R)/R_T$ be substantially less than unity in order that $\Delta p_m$ be substantially less than $\rho aL$. As a minimum example, the inlets 134*a* and 134*b* should have the same cross-sectional dimensions as the manifold 130. Each inlet 134*a* and 134*b* should also be comprised of half the length of the manifold 130 in the flow direction. The resulting ratio $(R_L+R_R)/R_T$ will be one-half, so that manifold pressure drop $\Delta p_m$ is one-half the total acceleration head. This ratio can be reduced further by shortening the inlets 134*a* and 134*b*, or by giving the inlets 134*a* and 134*b* a larger cross-sectional area than the manifold 130.

It is readily apparent from the foregoing that an ink supply system in which the manifold for a slant array of drop-on-demand ink jets is supplied from two fluidically independent reservoirs has several advantages over conventional ink supply systems involving a single reservoir. A dual reservoir configuration provides substantially greater ease in priming increased head compactness via the elimination of an external manifold vent, a doubling of the effective inlet flow area, and ability for the manifold to be purged without the need to drain off ink externally. Furthermore, because the dual reservoir configuration allows flow through the manifold to take place such that viscous forces balance an imposed acceleration head, the buildup of hydrostatic pressure in the manifold under acceleration is minimized. As a result, higher print head accelerations and hence higher printing rates are permissible in the dual reservoir configuration than in the prior art.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. Ink jet apparatus, comprising:

a scanning print head having a plurality of ink jet chambers, each of said chambers including an ink droplet ejection orifice and an inlet;

means for holding a supply of ink under pressure, said holding means including a pair of fluidically independent reservoirs mounted upon said scanning print head; and means for feeding ink from said holding means to said chambers, said feeding means including a manifold in communication with each said chamber inlet and a pair of feed tubes each said feed tube connecting a respective one of said reservoirs with said manifold, said feed tubes coupling to said manifold substantially at right angles thereto.

2. Apparatus according to claim 1, wherein said feed tubes and said manifold have substantially matching cross-sectional forms.

3. Apparatus according to claim 1, further comprising a transducer support portion which houses an array of transducers corresponding to said ink jet chambers, wherein said feed tubes are a substantially circular cross-sectional passage through said support portion.

4. Apparatus according to claim 3, wherein said manifold comprises a passage of substantially hemispherical form through said support portion.

5. Apparatus according to claim 1, wherein said reservoirs are located below said ink jet chambers.

6. Apparatus according to claim 1, wherein each said reservoir further comprises a port venting said supply of ink.

7. Apparatus according to claim 1, wherein said pressure is atmopheric pressure.

8. Ink jet apparatus comprising an ink jet head adapted to be accelerated along a scanning path, the ink jet head having means for holding a supply of ink and at least one ink jet orifice, the improvement comprising in combination therewith:

means for dividing the holding means into a pair of fluidically independent reservoirs, each said reservoir being adapted to store the supply of ink upon the scanning ink jet head under atmospheric pressure;

a manifold, of a first predetermined flow resistance $R_M$, arranged within the ink jet head substantially parallel to the scanning path, said manifold connected to supply ink from each of said pair of fluidically independent reservoirs to said at least one ink jet orifice;

first feed means, of a second predetermined flow resistance $R_L$, for connecting one of said pair of fluidically independent reservoirs and said manifold, said first feed means coupling to said manifold substantially at right angles thereto; and second feed means, of a third predetermined flow resistance $R_R$, for connecting the other of said pair of fluidically independent reservoirs and said manifold, said second feed means coupling to said manifold substantially at right angles thereto;

whereby a ratio of the sum of said second and third predetermined flow resistances $R_L$ and $R_R$ to the total sum of said first, second and third flow resistances $R_T$ is substantially less than unity such that an acceleration head developed in said manifold during acceleration of the ink jet head along the scanning path is substantially greater than a total pressure drop thereover.

9. The improvement according to claim 8, wherein said acceleration head is at least twice as great as said pressure drop.

10. The improvement according to claim 8, wherein said acceleration head is substantially greater than twice said pressure drop.

11. The improvement according to claim 8, wherein said manifold comprises a passage through said ink jet head, said passage having a predetermined length and a predetermined cross-sectional area.

12. The improvement according to claim 11, wherein said first and second feed means each comprise a tube of substantially the same cross-sectional area as said predetermined cross-sectional area of said manifold.

13. The improvement according to claim 12, wherein said predetermined length of said manifold is at least twice as long as each said tube.

14. The improvement according to claim 8, wherein said manifold comprises a hemispherical groove with a pair of ends in the ink jet head, said groove having a predetermined flow resistance.

15. The improvement according to claim 14, wherein said first and second feed means each comprise a substantially circular cross-sectional passage through said ink jet head, said passages arranged substantially perpendicular to said groove at its ends.

16. The improvement according to claim 15, wherein each said passage comprises a tube having a predetermined flow resistance.

17. The improvement according to claim 16, wherein a sum of the flow resistances of said tubes is substantially less than a total flow resistances of said sum and the flow resistance of said manifold.

18. A method of supplying hot melt ink to an ink jet apparatus having a print head adapted to be accelerated along a substantially horizontal scanning path, the print head including an array of ink jets connected to a manifold arranged within said print head substantially parallel to the scanning path, said method comprising the steps of:

forming a pair of fluidically independent reservoirs each of which is adapted to store ink under pressure within the scanning print head;

separately connecting each said reservoir to the manifold through respective inlet tubes mounted parallel to the manifold; and forming a pair of vents, each said vent separately venting a respective reservoir.

19. The method according to claim 18, further comprising simultaneously applying pressure to said pair of vents of prime the array of ink jets.

20. The method according to claim 18, further comprising applying pressure to one of said pair of vents thereby purging the apparatus by transferring ink from the pressured reservoir through the manifold to the other vented reservoir.

* * * * *